Patented Jan. 2, 1945

2,366,176

UNITED STATES PATENT OFFICE 2,366,176

SULPHONIUM SALTS

Edgar C. Britton and John N. Hansen, Midland, Mich., assignors to The Dow Chemical Company, Midland, Mich., a corporation of Michigan No Drawing. Application September 18, 1942,
Serial No. 458,864

5 Claims. (Cl. 260—607)

The present invention is concerned with the sulphonium salts of dinitrophenols and is particularly directed to compounds of the following formula,

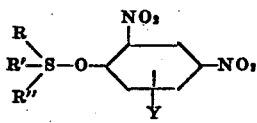

wherein R, R', and R'' each represents the same or different alkyl, cycloalkyl, hydroxy-alkyl, aralkyl, or aryl radicals, and Y represents a hydrogen, alkyl, cycloalkyl, aralkyl, or aryl radical. We have prepared representative members of this class of compounds and found them to be crystalline solids or viscous liquids decomposing at temperatures above 300° C. and somewhat soluble in organic solvents and water. These compounds are useful as insecticides, fungicides, stabilizers for plastic compositions, and dye intermediates. The invention also contemplates parasiticidal compositions comprising the sulphonium salts of dinitrophenols as active toxicants.

Among the alkyl groups which may be represented by R, R', and R'' in the foregoing formula are methyl, ethyl, normal-propyl, isopropyl, normal-butyl, secondary-butyl, isobutyl, tertiary-butyl, normal-amyl, secondary-amyl, iso-amyl, normal-hexyl, secondary-hexyl, normal-octyl, secondary-octyl, dodecyl, hexadecyl, etc. Cycloalkyl radicals falling within the scope of the R symbols include cyclopentyl, cyclohexyl, methyl-cyclohexyl, 2-methyl-5-isopropyl-cyclohexyl, etc. Representative hydroxyalkyl radicals represented by R, R', and R'' are 2-hydroxy-ethyl, 2-hydroxy-propyl, 3-hydroxypropyl, 4-hydroxy-butyl, hydroxy-amyl, etc. The aralkyl radicals represented by the R symbols include benzyl, alpha-phenyl-ethyl, beta-phenyl - ethyl, beta-(alpha-naphthyl)-ethyl, gamma - phenyl - propyl, delta-phenyl-butyl, alpha - phenyl-butyl, omega-phenyl-octyl, etc. Representative aryl radicals falling within the scope of the R symbols are phenyl, 4-methylphenyl, 2,4 - dichloro - phenyl, 4-tertiarybutylphenyl, 2-cyclohexyl-phenyl, 2-phenyl-phenyl, etc. The alkyl, cycloalkyl, aralkyl, or aryl radicals represented by Y in the formula may be any of those set forth above.

The new compounds may be prepared by reacting a suitable sulphonium iodide, chloride, or bromide with a dinitrophenol in the presence of an alkali metal hydroxide such as sodium hydroxide. This is conveniently accomplished by dissolving the dinitrophenol in aqueous alkali and thereafter adding the sulphonium halide compound portionwise to the mixture with stirring at temperatures up to 100° C. The reaction is generally complete within a few minutes after which the mixture is cooled, and the sulphonium salt of dinitrophenol compound recovered by filtration, salting out, or layering off of the aqueous portion of the reaction mixture depending upon whether the phenolic reaction product is a crystalline solid or an oil. The resulting product may be purified according to any of the customary procedures as by recrystallization, washing with water or other solvent, treatment with bone charcoal, etc.

The sulphonium halides employed as starting materials in accordance with the present invention are readily prepared by reacting an organic sulphide containing two of the desired R groups as set forth in the formula with an organic halide embodying the other R radical. A spontaneous addition reaction is obtained whereby the sulphonium halide is formed. In a representative preparation, methyl-ethyl sulphide is caused to react with methyl iodide to produce dimethyl-ethyl sulphonium iodide.

The following examples illustrate the class of compounds with which the present invention is concerned, but are not to be construed as limiting.

*Example 1*

5.94 grams (0.03 mole) of 2,4-dinitro-6-methyl-phenol was dissolved in a mixture of 11.4 milliliters of 10 per cent aqueous sodium hydroxide and 20 milliliters of water. 15 milliliters of dimethyl-ethyl-sulphonium iodide solution comprising 0.03 mole of the iodide was added portionwise to the phenolate solution with stirring. When the iodide solution had all been added, the mixture was cooled and the desired compound salted out by addition of saturated sodium chloride solution to the mixture. The dimethyl-ethyl-sulphonium salt of 2,4-dinitro-6-methyl-phenol was obtained in substantially pure form by filtration of the salted mixture and drying of the residue. This product was a yellow crystalline solid readily soluble in water and decomposing at 328° C.

*Example 2*

28.8 grams of sodium 2,4-dinitro-6-cyclohexyl-phenolate was dissolved in 175 milliliters of water and 50 milliliters of an aqueous solution of dimethyl-ethyl-sulphonium iodide containing 0.1 mole of the active salt was added thereto portionwise and with stirring. The reaction mixture was then cooled whereby a red oil separated from solution. This crude product was layered off and cooled to below room temperature whereupon crystallization was accomplished. A small amount of oily residue was pressed out of the product to obtain 21 grams of dimethyl-ethyl-sulphonium salt of 2,4-dinitro-6-cyclohexyl-phenol as a bright red crystalline material melting with decomposition at 310° C.

Example 3

18.4 grams (0.1 mole) of 2.4-dinitrophenol and 4.17 grams of sodium hydroxide were dissolved in 100 milliliters of water. 95 milliliters of an aqueous solution of di-normalbutyl-methyl-sulphonium iodide containing 0.1 mole of the salt was added portionwise thereto with stirring. The resultant hot clear solution was cooled to below room temperature whereupon a heavy yellow precipitate was formed. The mixture was then filtered to obtain 10.5 grams of the crude sulphonium salt product. Upon recrystallization from a mixture of methyl alcohol and chloroform there was obtained the di-normalbutyl-methyl-sulphonium salt of 2.4-dinitrophenol as a yellow crystalline product melting at 312°–314° C. with decompostion.

Example 4

In a similar fashion other sulfonium halides were reacted with dinitrophenols to obtain the following sulphonium salt compounds.

Tri-normalbutyl-sulphonium salt of 2.4-dinitro-6-cyclohexyl-phenol as a yellow crystalline salt decomposing at 315° C.

Mixed alkyl-sulphonium salt of 2.4-dinitro-6-cyclo-hexyl-phenol as a viscous red resin-like material soluble in water and methyl alcohol. This product was produced from a crude petroleum mercaptan mixture.

Normalbutyl-methyl-2-octyl-sulphonium salt of 2.4-dinitro-6-methyl-phenol as a red mobile liquid, very slightly soluble in water, soluble in ethyl alcohol, and substantially insoluble in white mineral oil.

Di-(2-hydroxy-ethyl)-methyl-sulphonium salt of 2.4-dinitro-6-cyclohexyl-phenol as a yellow crystalline compound slightly soluble in water and ethyl alcohol and decomposing at 307° C.

Tri-(2-hydroxy-ethyl)-sulphonium salt of 2.4-dinitro-6-cyclohexyl-phenol as a crystalline product somewhat soluble in water and melting with decomposition at 309° C.

Di-normalbutyl-methyl-sulphonium salt of 2.4-dinitro-6-cyclohexyl-phenol as a red viscous oil.

Di-methyl-ethyl-sulphonium salt of 2.4-dinitro-phenol as a yellow crystalline salt melting with decomposition at 307° C.

Ethyl-methyl-phenyl-sulphonium salt of 2.4-dinitro-6-cyclohexyl-phenol as a partially crystalline oily product.

Tri-ethyl-sulphonium salt of 2.4-dinitro-6-cyclo-hexyl-phenol as a yellow crystalline solid, very soluble in ethyl alcohol, difficultly soluble in chloroform, and melting with decomposition at 324° C.

Tri-(2-hydroxy-ethyl)-sulphonium salt of 2.4-dinitro-6-phenyl-phenol as a yellow crystalline salt melting at 134°–136° C., and somewhat soluble in water.

Di-methyl-ethyl-sulphonium salt of 2.4-dinitro-6-secondarybutyl-phenol as a hygroscopic, semi-crystalline, red product very soluble in water.

The sulphonium salts of dinitrophenols as described in the preceding examples may be employed as active toxicants in parasiticidal compositions. In such use the compounds are preferably employed in combination with an inert carrier. All of these compounds exert a definite insecticidal and fungicidal action and have been found particularly well adapted for use in fungicidal spray or dust compositions. Most of the compounds are relatively soluble in water and impart to aqueous solutions desirable wetting properties.

When employed in dust mixtures, the sulphonium salts are preferably dispersed in or on solid finely divided inert carriers such as diatomaceous earth, volcanic ash, bentonite, talc, finely divided wood flour, and the like. Dust compositions comprising from about 0.5 to 10 per cent by weight of the salt are particularly useful.

Mixtures of the sulphonium salts with solid inert carriers may also be dispersed in water and employed as sprays. In preparing dust mixtures for use in such aqueous composition, the sulphonium salts may be employed in amounts up to 80 to 90 per cent by weight of the concentrate. Similarly, aqueous solutions or dispersions of the sulphonium salts or solutions or dispersions thereof in such solvents as alcohol, carbon tetrachloride, and petroleum distillate are useful for insecticidal and fungicidal control.

Various wetting, sticking, and dispersing agents such as glyceryl oleate, alkali metal caseinates, aluminum naphthenate, alkali metal salts of sulphonated aromatic hydrocarbons or phenols, sodium lauryl sulphate, partially neutralized sulphuric acid derivatives of fatty acids and oils, blood albumen, soap, and the like may be employed in combination with the new sulphonium salts in either dust or spray compositions. Similarly, the new salts may be employed in combination with other insecticidal and fungicidal agents such as lead arsenate, petroleum oil, nicotine, sulphur, copper sprays, pyrethrins, rotenone, cryolite and the like.

The following examples illustrate the use of the sulphonium salts in parasiticidal compositions.

Example 5

18.2 parts by weight of the dimethyl-ethyl-sulphonium salt of 2.4-dinitrophenol, 72.7 parts of diatomaceous earth, and 9.1 parts of sodium lauryl sulphate were ground together to form a parasiticidal dust concentrate. Sufficient of this composition was dispersed in water that the ultimate spray mixture comprised 0.5 pound of the sulphonium salt per 100 gallons. This composition was sprayed on beans infested with red spider adults and found to give a kill of 95.6 per cent without causing any injury to the foliage.

Example 6

67 parts by weight of di-normalbutyl-methyl-sulphonium salt of 2.4-dinitrophenol and 33 parts of sodium lauryl sulphate were ground together to form a parasiticidal concentrate. An aqueous spray composition having dispersed therein sufficient of the concentrate to provide 0.5 pound of the sulphonium salt per 100 gallons killed 97 per cent of red spider adults on beans without injury to the foliage.

Example 7

80 parts by weight of dimethyl-ethyl-sulphonium salt of 2.4-dinitro-6-cyclohexyl-phenol and 20 parts by weight of sodium lauryl sulphate were ground together to form a parasiticidal concentrate. Sufficient of this composition was dispersed in water to yield a spray composition comprising 1.0 pound of the sulphonium salt per 100 gallons. Against Mexican bean beetle this spray mixture was found to give a kill of 85 per cent without injury to foliage. A control determination with magnesium arsenate killed only 75 per cent of the organism.

A further composition was prepared in which 20 parts by weight of the sulphonium salt was ground with 80 parts of sodium lauryl sulphate. An aqueous spray mixture embodying this concentrate and containing 0.0625 pound of the sulphonium salt per 100 gallons gave a kill against red spider on beans of 100 per cent without injury to the bean foliage.

*Example 8*

7.6 parts by weight of the ethyl-methyl-phenyl-sulphonium salt of 2.4-dinitro-6-cyclohexyl-phenol, 30.8 parts of diatomaceous earth, and 61.6 parts of sodium lauryl sulphate were compounded together substantially as described in the preceding examples to form a parasiticidal concentrate. An aqueous spray prepared from this composition and comprising 0.0312 pound of the sulphonium salt per 100 gallons gave 100 per cent kill of red spider on beans without injury to the plant.

*Example 9*

A parasiticidal composition was prepared by mixing and grinding together 67 parts of sodium lauryl sulphate and 33 parts by weight of a mixed alkyl sulphonium salt of 2.4-dinitro-6-cyclohexyl-phenol, as prepared from crude petroleum mercaptan mixture. An aqueous composition comprising sufficient of this concentrate that the concentration of the sulphonium salt was 0.125 pound per 100 gallons gave a kill against red spider on beans of 100 per cent without injury to the bean foliage.

*Example 10*

Aqueous spray compositions were prepared by dissolving various amounts of the sulphonium salts of dinitro-phenols in water. These sprays were applied for the control of red spider on beans. The kill obtained with the tri-(2-hydroxy-ethyl)-sulphonium salt of 2.4-dinitro-6-cyclohexyl-phenol at 0.25 pound per 100 gallons was 100 per cent. A like kill was obtained with a composition comprising di-(2-hydroxy-ethyl)-methyl-sulphonium salt of 2.4-dinitro-6-cyclohexyl-phenol in the same concentration.

*Example 11*

Dust compositions were prepared by wetting finely divided pyrophyllite with organic solvent solutions of various sulphonium salts of dinitro-phenols and thereafter evaporating off the volatile solvent. The amounts of materials were so regulated that each of the final dust compositions contained 1 per cent by weight of the sulphonium salt. These mixtures were applied to the surface of a luxuriant growth of a wood destroying organism of the type of fomes annosus and identified as Forest Products Laboratory Culture, No. 517. The dusting was carried out so that a deposit of 1.4 milligrams of the dust was obtained per square centimeter of mold surface. In this determination the di-methyl-ethyl sulphonium salt of 2.4-dinitrophenol and the di-methyl-ethyl-sulphonium salt of 2.4-dinitro-6-methyl-phenol gave 100 per cent inhibition of mold growth. The mixed alkyl sulphonium salt of 2.4-dinitro-6-cyclohexyl-phenol (as prepared from mixed petroleum mercaptans) gave an inhibition of 98 per cent.

Other sulphonium salts of nitro-phenols may be substituted for those set forth above to obtain comparable results. These salts may be obtained by the reaction of such representative compounds as 2.4-dinitro-5-cyclohexyl-phenol, 2.4-dinitro-6-benzyl-phenol, 2.4-dinitro-5-methyl-phenol, 2.4-dinitro-6-normal-octyl-phenol, 2.4-dinitro-6-dodecylphenol, and the like with tri-cyclohexyl, di-cyclohexyl-methyl-, mono-cyclohexyl-di-(3-hydroxy-propyl)-, benzyl-dimethyl-, phenyl-di-isobutyl-, di-lauryl-phenyl-, benzyl-di-cyclohexyl-, and (2-hydroxy-ethyl)-methyl-benzyl-sulphonium halides. Similarly, compositions comprising these new compounds may be employed for the control of such insect pests as aphis, thrips, scale organisms, borers, mosquito larvae, grasshoppers, mites, and the like as well as various wilt and fungus organisms normally attacking plant growth.

We claim:

1. A compound having the formula,

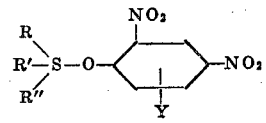

wherein R, R', and R'' each is selected from the group consisting of alkyl, cycloalkyl, hydroxyalkyl, aralkyl, and aryl radicals, and Y represents a member of the group consisting of hydrogen, alkyl, cycloalkyl, araykyl, and aryl radicals.

2. A compound having the formula,

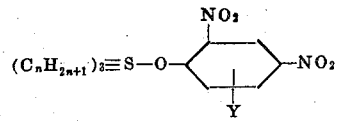

wherein Y represents a member of the group consisting of hydrogen, alkyl, cycloalkyl, aralkyl, and aryl radicals, and $n$ is an integer.

3. A sulphonium salt of 2.4-dinitro-6-cyclohexyl-phenol having the formula,

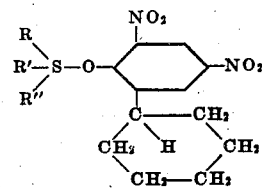

wherein R, R', and R'' each is selected from the group consisting of alkyl, cycloalkyl, hydroxyalkyl, aralkyl, and aryl radicals.

4. A sulphonium salt of 2.4-dinitrophenol having the formula,

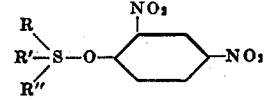

wherein R, R', and R'' each is selected from the group consisting of alkyl, cycloalkyl, hydroxyalkyl, aralkyl, and aryl radicals.

5. A sulphonium salt of 2.4-dinitro-6-methyl-phenol having the formula,

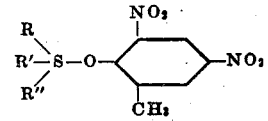

wherein R, R', and R'' each is selected from the group consisting of alkyl, cycloalkyl, hydroxyalkyl, aralkyl, and aryl radicals.

EDGAR C. BRITTON.
JOHN N. HANSEN.